United States Patent [19]

Tolin

[11] Patent Number: 4,864,503

[45] Date of Patent: Sep. 5, 1989

[54] METHOD OF USING A CREATED INTERNATIONAL LANGUAGE AS AN INTERMEDIATE PATHWAY IN TRANSLATION BETWEEN TWO NATIONAL LANGUAGES

[75] Inventor: Bruce G. Tolin, Lisle, Ill.

[73] Assignee: Toltran, Ltd., Barrington, Ill.

[21] Appl. No.: 10,989

[22] Filed: Feb. 5, 1987

[51] Int. Cl.[4] ............................................. G06F 15/38
[52] U.S. Cl. .................................. 364/419; 364/900; 364/920.4; 364/300
[58] Field of Search ... 364/200 MS File, 900 MS File, 364/419; 434/157

[56] References Cited

U.S. PATENT DOCUMENTS

| | | | |
|---|---|---|---|
| 4,468,756 | 8/1984 | Chan | 364/900 |
| 4,502,128 | 2/1985 | Okajima et al. | 364/900 |
| 4,635,199 | 1/1987 | Muraki | 364/419 |
| 4,641,264 | 2/1987 | Nitta et al. | 364/900 |
| 4,706,212 | 11/1987 | Toma | 364/900 |

Primary Examiner—Eddie P. Chan
Assistant Examiner—Kevin A. Kriess
Attorney, Agent, or Firm—J. R. Halvorsen

[57] ABSTRACT

A method of using a created international language as an intermediate pathway in translation between two national languages, wherein the first language is translated into the created international language, the latter serving as a bridge, which is then translated into the second language. In the present method there are interpretive steps rather than a strict word for word translation, without interpretation, which has proven falacious in the past.

29 Claims, 3 Drawing Sheets

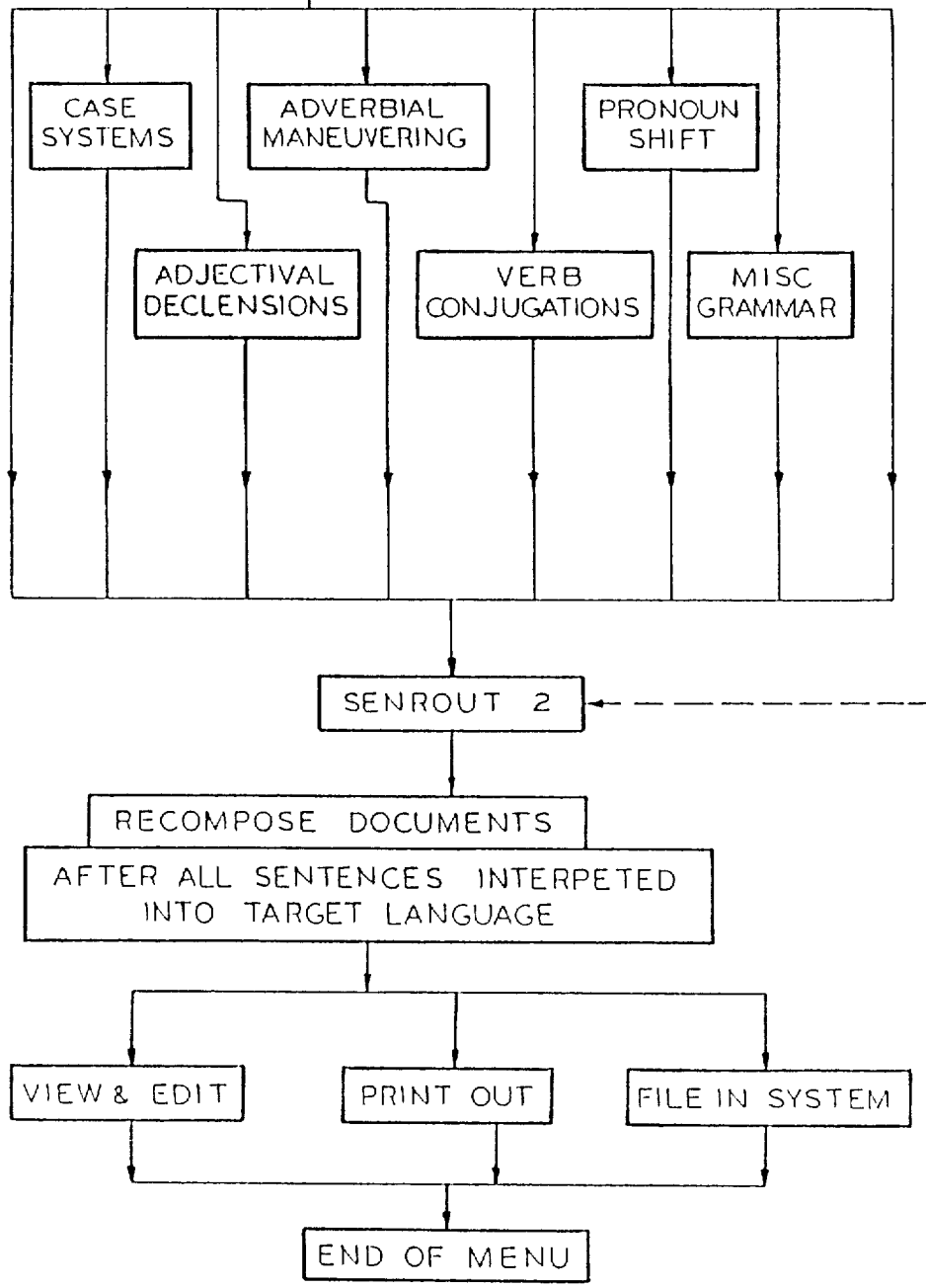

METHOD OF USING A CREATED INTERNATIONAL LANGUAGE AS AN INTERMEDIATE PATHWAY IN TRANSLATION BETWEEN TWO NATIONAL LANGUAGES

BACKGROUND OF THE INVENTION

The present invention relates to the translation of documents having a source text written in any one of a plurality of national languages being translated into a text that is written in any one of a plurality of second target national languages by utilizing a created international language as an intermediate pathway between the two chosen national languages.

The desire of various nationalities speaking different languages to readily converse has been ever present in the history of humanity. There are about 3,000 known languages in the world (the number varies according to what is counted as a language; dialects that are clearly just that are not included in this number), and each is the vehicle of a culture that is different in at least some ways from any other culture. The learning and teaching of languages, the recording of languages in intercultural communication are matters of primary importance.

Languages have had to be taught and learned for centuries. Everywhere, when speakers of different languages have come in contact, somebody had to learn a foreign language. There have always been individuals who found it interesting or profitable to do this. The earliest of explorers and traders were forced by necessity to learn to understand one another's language or to perish in the economic as well as the physical worlds. This, as we all know, resulted in extensive and long language studies with the erudite academicians handling the complex aspects of the communications exchange, while the more pragmatic day-to-day traders and businessmen developed short terse means of communication. A need arose to satisfy the requirements of an exact but easy means for correspondence between lay persons and small businessmen.

Small, handheld, phrase books proliferated to facilitate phonetic intercourse by visiting tourists and servicemen. Unfortunately, the phonics in these booklets, as well as their limited scope, limited the amount of intercourse possible. Small dictionaries that permitted word to word translation were available but unfortunately they did not provide a means for transposing words to give a more accurate grammatical rendition in the target language. Variations on these items became available upon the appearance of the liquid and gaseous crystal readout devices which permitted storage of a limited vocabulary of words and their direct translatable equivalents in a phonic form. Here again, the limited capacity did not permit the introduction of adequate grammatical improvement of syntax.

The advent of the personal computers and the microprocessors has brought a flood of approaches to the patent offices around the world. The devices have ranged from direct word for word translation devices to key word translation directly into phrases. For example, a word to word translation device can be found in U.S. Letters Pat. No. 4,502,128, TRANSLATION BETWEEN NATURAL LANGUAGES, this patent being directed to an inputting of a sentence described by a first natural language being sectioned into individual words. Parts of speech corresponding to these individual words are retrieved from a lexical word storage, whereby the input sentence is described by a corresponding string of the parts-of-speech as retrieved. A translation pattern table previously prepared compares strings of parts-of-speech for the first natural language with those of the second language and transforms the first strings of parts-of-speech into strings of parts-of-speech of the second language. The output sentence described by the second natural language is generated by sequencing target words in accordance with the sequential order of the parts of speech of the string pattern obtained after the transformation. This is a complex procedure at best.

U.S. Letters Pat. Nos. 4,412,305; 4,541,069 4,439,836 and 4,365,315 relate to translation devices wherein a single word is used as the input to produce the translation of entire groups of words, such as sentences or phrases; a single word entered will access particular sentences within limited subject categories; letters within words or groups of words produces an equivalency detectable by a comparison circuit resulting in the representation in a second language of a plurality of words regardless of whether it is a noninflected word or an inflected word; and phrases can be tied to computer specified aural or visual control messages for use by an operator who chooses to use a particular language in the operation of a machine tool. Similarly, alphabetical accessing to an electronic translator can be accomplished by storing address codes with each word, as in U.S. Pat. No. 4,541,069; as well as utilization of a system for automatically hyphenating and verifying the spelling of words in a multi-lingual document can be carried out under U.S. Pat. No. 4,456,969.

As can be seen from study of these prior art references, generally found in U.S. Cl. 364/900, a direct translation from one natural language to another natural language has a multiplicity of roadblocks, either in the lack of an available direct translation or in major grammatical problems due to language structure or in the relative stage of development of one of the languages.

SUMMARY OF THE INVENTION

The present invention relates to the translation between two national languages by the utilization of an intermediate step or pathway of translating into a created international language from the first or source national language and then translating from the created international language into the second or target national language.

Such a translation is reversible in either direction and can accommodate translation from one national language into the created international language and then translate into a multiplicity of second national languages from the created international language text.

By utilization of a created international language intermediate path, it simplifies translation. Since most created international languages only have regular verbs, the irregular verb problem is eliminated in the initial translation by all verbs being made regular or shunted aside into a secondary translation operation after all other translation has been accomplished.

It must be recognized that, while the term "created international language" or "artificial language" is used herein, this invention contemplates as well the utilization of alphabetic, numeric, alphanumeric, symbolic (or any combination of these) that relates to a compressed vocabulary and/or syntax (or a non-compressed vocabulary) but with each having a simplified and regular grammar.

Redundancy is generally overcome by eliminating prepositional phrases and infinitives. It allows a choice of the simplistic approach as well as a broader more polished path, but both of which employ accuracy in movement between the two national languages.

The use of parse and flags to numerically keep track of the sentence being worked on also expedites the operation of the method.

BRIEF DESCRIPTION OF THE DRAWING

FIGS. 2A and 2B form a block diagram showing a schematic arrangement of the flow of information within a computer under the method of the present invention and can be referred to in following the description that follows.

DESCRIPTION OF THE PREFERRED EMBODIMENT

This invention contemplates the usage of a computer, such as an IBM ® PC, that utilizes MS-DOS and is capable of accepting BASIC as well as other programming languages, such as C/PM, Assembler language, Cobol, Fortran, or any other compatible computer language. Other software such as compilers plus other speed enhancing arrangements can be utilized in subroutines as well as in the main stream of this method.

As was indicated above, this method of translation between two national languages includes the step of utilizing a created international language bridge, whereby anyone of a plurality of national languages can be compatibly translated into the chosen created international language and, then, can be translated from the created international language into any chosen one of a plurality of national languages. There are several such "created" international languages, the most common of which is Esperanto created in the 1880's by Dr. Ludovic Lazarus Zamenhof (1859-1917) of Poland. It contains a compressed vocabulary (roughly one-tenth the number of words as English) and a completely simplified and regular grammar. This eliminates the need for many complex mathematical statements to account for the grammatical differences between existing national languages. While other created international languages, for example, Inter Lingua, Modified Esperanto, or Volupuk, could be used, the present disclosure utilizes Esperanto. It must be recognized that, while the term "created international language" or "artificial language" is used herein, this invention contemplates as well the utilization of alphabetic, numeric, alphanumeric, symbolic (or any combination of these) that relates to a compressed vocabulary and/or syntax (or a non-compressed vocabulary) but with each of these having a simplified and regular grammar.

Figure 1:
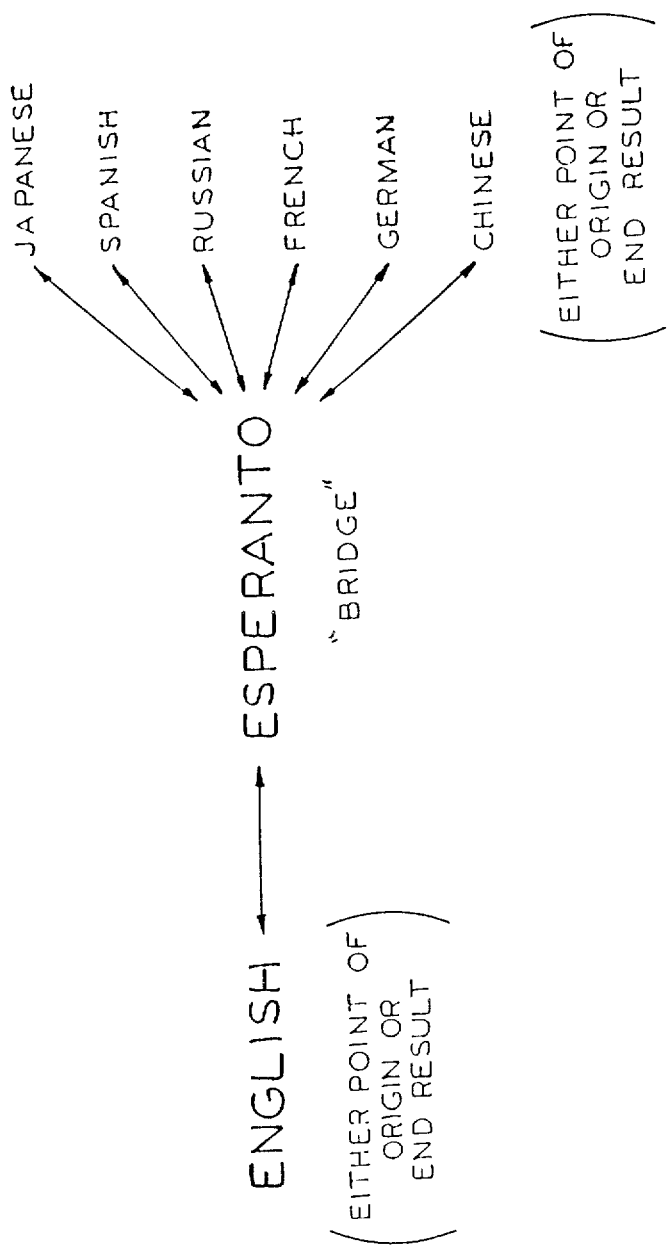
FIG. 1 is a diagramatic showing of the utilization of a created international language, the example utilizes Esperanto although others could be used, as an intermediate pathway in translating between two national languages.

There are Esperanto textbooks available in some fifty languages. The two national languages used in the illustrated embodiments of this specification are English and German, however, the method can be successfully utilized with a multitude of other languages, i.e., Japanese, Spanish, French, Russian, and Chinese. Additionally, most all languages are compatible with an intermediate simplified and regularized language, one of which is Esperanto, and they could be readily adapted for use with this method. It must be realized that, by utilizing Esperanto as the intermediate pathway between the two national languages, the method is reversible and the translation from language A to language B can go in the opposite direction, from language B to language A, with equal facility, see FIG. 1.

A multiple language dictionary data base, including Esperanto, was prepared and placed on a limited access disk; along with other subroutines, that can be accessed by computer, are provided and called upon to smooth out the translation as it progresses. It should be recognized that it is not only possible, but also acceptable, in certain circumstances, to utilize the simplistic approach of translating from a base national language into Esperanto and then directly into the target national language. This often produces an elementary type of resulting language that is totally acceptable in instances where the recipient of the document is not linguistically sophisticated, or where the message being conveyed does not require additional nuances. This is often utilized to great advantage in brief offers and acceptances in commercial transactions, where one party orders a specific quantity of a product having a generic name utilized in both languages and the second party merely confirms availability and delivery information. It also is often readily acceptable in the scientific community.

Figure 2A:
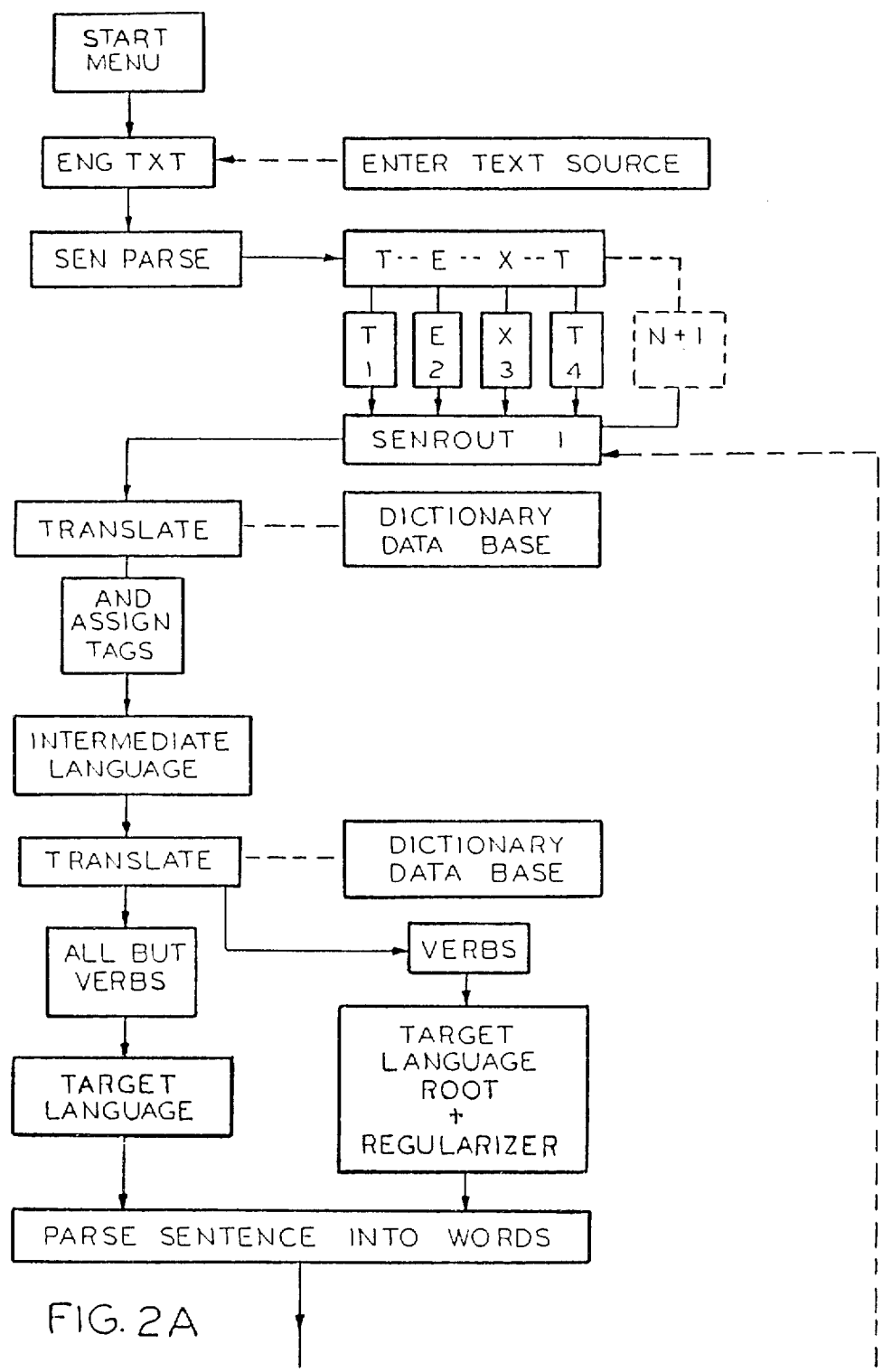

The niceties required in social intercourse, however, can be supplied by the application of the other subroutines shown in abbreviated flowchart form in FIG. 2, and which are described now in more detail.

An operator makes a choice, from an appropriate starting menu, of the national language that will be used in entering the text that is to be translated. From a keyboard terminal, the source text in the chosen language, in this example English, is introduced into the computer and placed in a created text file. <ENGTXT> (It should be noted that the language of the boxes in the flow chart of FIG. 2 will be utilized in the description of each of the steps in this method)

When the text has been fully entered into the text file it is then operated upon and parsed into individual sentences with each sentence being placed in it own file. <SENPARSE>

Each of the individual sentence files is preferably "flagged" whereby it is numerically kept track of, thereby aiding the computer in ascertaining which sentence it is working on, as well as providing a return point of a loop for operation on successive sentences <SENROUT1>. (In the flowchart of FIG. 2 the term "TEXT" is whimsically shown as being broken up into individual parts and includes an additional one indicated as "n+1" which would indicate that all of the sentences had been handled and the computer would then proceed to the steps leading to "end".)

With the text parsed into individual sentences and properly flagged, the individual words are translated from the original text language, English, into Esperanto to form the streamline intermediate pathway. Each individual word is assigned a grammatical tag as it is being translated. All irregular verbs in English are "smoothed out" into regular ending Esperanto verb endings. Since Esperanto uses one-tenth the number of words that are found in the English vocabulary the number of "lookups" in the electronic data base is drastically reduced. The dictionary data base, as was previously noted, is provided with limited access whereby introduction of special words that have a highly repeated volume of usage or which are of a specialized nature, i.e., medical, scientific, or restricted commercial, can under proper circumstances and procedures be added to the dictionary.

Continuing this translation, it is placed in a temporary file until the entire sentence being acted upon is completely translated into the intermediate language.

The next step is for the computer to access another sector of the electronic dictionary data base for the translation of all intermediate pathway Esperanto words (except verbs) into the target language equivalents, in this example the target language is German.

All of the remaining untranslated words, namely, the verbs, are translated into target language verb roots, except for the verb ending. The program than makes use of artificial present/past/future endings which impose a regularity on "irregular" verb systems. It also serves to conjugate "regular" verbs. For example, the German verb "schen" (to see) is rendered as "sehas" (the "-as" is the Esperanto ending), therefore, all of the German verbs are artificially regularized for now.

Each sentence then is parsed into individual words, each being preferably assigned their own temporary file.

After each sentenced is parsed, the program may terminate by utilizing the path to the far left in FIG. 2 and proceed solely on the basis of the translation from the source language into the intermediate pathway language and thence into the target language. As has been previously indicated, there are circumstances where such a translation is totally adequate and has the advantage of speed. If, however, a more refined interpretation is required then the program provides a plurality of alternative subroutines which can be called up for action on the parsed sentence. There is no important order or sequence in which these subroutines must be used. Further, it is not mandatory that each of them be used in the smoothing process since it is conceivable that, due to structure of the target language, it might not require or permit the application of a particular subroutine.

It is important to remember that each time an individual word is transformed, or acted upon in any fashion, it is replaced in its sentence at the end of the subroutine then being utilized. Similarly, the order set forth in this descriptive material is not controlling of the ultimate order of use, nor does it affect the outcome anticipated.

Going forward with the translation, the parsed sentence may proceed to the subroutine where the miscellaneous grammar program moves the position of words within the translated sentence, where necessary, or, conjugates irregular verbs, or, deals with "one-of-a-kind" situations peculiar to the target language, in this example German.

In certain languages there exist a system of cases, meaning, certain words will appear differently by themselves, or will change the manner in which "surrounding" words (such as adjectives) are used in conjunction with such words. These "Cases" can be applied, where necessary, for a particular language.

Adjectives are declined according to the rules of the target (German) language, based upon prepositions encountered in a particular phrase, and the noun following. This is accomplished through the use of context recognition, which is utilized in another of the steps available herein.

An infinitives program (not shown) restores verbs to their "dictionary" format, as required; in the target (German) language, for example, "to go"—"zu gehen" becomes just "gehen". The "zu"—"to" is redundant for purposes of this invention.

An adverb program acknowledges the idiosyncrasies of various languages and shifts adverbs around verbs in the fashion of the chosen target language: e.g. "He speaks fluently"—"He fluently speaks", . . . etc. This is another polishing operation available in this method.

There often are different verb conjugations that are unique to the target language (both in "regular" as well as "irregular" verbs). Instead of having an astronomical number of irregular verbs in the original language that must be matched to an excessive number of verbs in the target language, this is an area where the intermediate pathway language, in this embodiment, Esperanto, saves time and computer memory storage space in that the combinational possibilities are reduced by going through the "regular" Esperanto verb stage. To provide smoother text, however, this subroutine can be utilized to handle the verb conjugations in the target national language.

Quite often a pronoun will change based upon context, for example, if the pronoun is "doing" something it will differ from the same pronoun that is "being acted upon". The context evaluation and correction will be handled in the subroutine designated Pronoun Shifts.

As sort of a sentry or watchdog the sub-routine <SENROUT2>, in the present method, checks the "flag" previously generated in "SENROUT1" and decides where to go, i.e., to do another sentence, or, to go on towards "end", in the Menu, if there are no more sentences to do.

All of the sentences can be individually collected in a single temporary file where the final document is recomposed sentence by sentence in the target language, all within the same file. (It must be remembered that this could be designated "RUSSIAN" or any other national language that is serving as the target language) This file can also be used if the final translation terminated with the translation from Esperanto to the target language without utilizing any of the "fine tuning" subroutines discussed above.

In the final sub-routine of the method, this step strips off any grammatical tags accumulated during the translation/interpretation process and can, if desired, "print" the words of each sentence.

The document is now available, optionally, for a final viewing in the target (German) language, and, if desired, for final manual editing prior to hard copy printing.

The final optional printing operation permits a choice of printing "hard copy" of either or both the original national language source text and the target national language text. Files can be preserved in chosen subdirectories and/or can be edited and interfaced with compatible word processing programs prior to possible filing in a chosen subdirectory. The program returns the user to the Menu in preparation for the next translation.

As was previously indicated, two of the optional steps were not interfaced with the program described. These, once again, are subroutines or files that may provide additional smoothing out of the final translation. The first of these optional steps in the method would further refine the initial input by a series of files which would sequentially: (i) immediately parse sentences into individual word files, (ii) such parsing would not only translate words into the created international language as each word is entered into its individual file, but, also, it would add a grammatical tag on each word, e.g. "you"—"PN:you PN;" (PN= pronoun); (iii) this is based on words before or after, determines if a word is a noun or verb. This is a context determiner that basically is a form of "artificial intelligence" and requires an in-depth analysis, with multitudinous examples to be checked against, of the context being acted upon.

The other optional operation takes place in treating the accomplished translation by taking care of the English language peculiarity of having forms of "to do" or "do" in front of verbs, (e.g. I do go=I go/ I did go=I went).

While these refinements are often desirable in social niceties, they are not mandatory for simple correct communication, but rather merely show an in depth knowledge of the nuances of the language. In certain instances this can be of great help from a social prestige position, however, the day to day dealings can probably be handled quite as effectively without bowing to the added time parameter required for these refinements and obtain the same efficacy through use of the abbreviated direct intermediate pathway created language translation.

Further, it is contemplated that this method can be interfaced with various types of synthesizers, e.g., whereby keyboards can be interfaced through computers to modems and where the typing of text will be translated into spoken word for transmission to the recipient, or, voice recognition can be combined with phone modems, e.g., automatic translation of conversations into either written, voice-synthesized translation or other electronic representation. This could be a reversible procedure if the recipient had the same program at his end, or alternatively, it could be received in printed form on the output CRT when received over a modem interfaced with a computer.

Utilization of the method can be applied in commercial situations by an interface of a computer with modem-type communication lines and where desired reponses could be made in the sender's national language and translated by the computer to be transmitted over the communication lines in the national target language of the recipient. It is contemplated that the written document could be synthesized into a synthesized voice translation or vice versa; all is interchangeable.

Other examples and modifications of the method and apparatus set forth herein will be apparent to those skilled in the art, but it is my desire to be limited only by the scope of my appended claims.

I claim:

1. A universal machine method implemented on a data processing device utilizing a data base for performing interpretations between any one of a plurality of first national source languages and into any one of a plurality of second national target languages comprising:

a first step of storing a source text in said any one first national language in an electronic storage means as a first text file;

said first step including a first substep that parses said source text into individual sentences, with each sentence in its own separate subfile;

a second step of interpreting said sentences into a created internationally universal language which serves as an intermediate pathway, as the word making up said sentences are translated into the created internationally universal language, they are entered into individual files consisting of the word plus a grammatical syntax tag, such tag consisting of a designation of the word's grammatical posture, i.e., noun, pronoun, verb, adverb . . . etc., and a third step of interpreting said tagged words from said created internationally universal language into any one of said second natural national target languages; said interpretation steps being totally reversible within said intermediate pathway of said universal international language, there being no requirement of reworking of said intermediate pathway language to accommodate changes in source or target languages.

2. A machine method of performing reversible interpretations according to claim 1 wherein the selection of the grammatical tag is based upon the syntax relationship of the tagged word with the words positioned before or after the tag word and, an artificial intelligence is provided in said data base and capable of being consulted to utilize data source means for determination of said grammatical tag based on usage within said sentences.

3. A machine method of performing reversible interpretations according to claim 2 wherein the interpretation into said target language is subjected to a plurality of secondary programs in said data base to analyze and adjust said words within said sentences based on their grammatical tags.

4. A method of performing reversible interpretations according to claim 3 wherein said interpreted and adjusted sentences are subjected to declination of adjectives according to construction rules of the target language and based upon prepositions encountered in the phrase being subjected to examination and the position of the following noun, based on context recognition in said data storage.

5. A method of performing reversible interpretations according to claim 4 wherein said interpreted sentences, as previously adjusted, are subjected to an adverb and verb program, said adverbs, if any, being shifted around verbs according to the common preference in the target language, said verbs being conjugated in accordance with the unique conjugations of the target language morphology, the created internationally universal language having saved time and memory space by regularizing the verbs in initial translation, thereby eliminating the requirement for an unusually high number of irregular verbs in the first national language being matched to an excess number of irregular verbs in the target national language.

6. A method of performing reversible interpretations according to claim 5 wherein the interpretations of the words in each sentence into the target national language are collected and then recomposed line by line into a document in the target national language; and the grammatical tags are then removed.

7. A machine method of performing translations according to claim 1 wherein said created internationally universal intermediate pathway language is chosen from a list consisting of at least: Esperanto, Inter Lingua, Modified Esperanto, Volupuk, or any alphabetic, numeric, alphanumeric, symbolic or combination thereof that is related to a compressed vocabulary and syntax but with a simplified and regular grammar.

8. A machine method of performing translations according to claim 1 wherein all irregular verbs in the first national language are transformed into regular verb endings within said created internationally universal language.

9. A machine method of performing translations according to claim 8 wherein all created internationally universal language words are translated into the target language except for verbs.

10. A machine method of performing translations according to claim 9 wherein the remaining words, namely verbs, are translated into the target natural language with artificial endings which makes them regular.

11. A machine method of performing translations according to claim 1 wherein each said text subfile is provided with a flag adapted to assist in keeping track of which subfile is being worked on and said flags of the subfiles are checked to determine whether there are further sentences to be worked upon.

12. A machine method of performing translations according to claim 11 wherein if all sentences have been worked upon and translated the translated sentences in the target language are collected and the source text is recomposed into sentences in the target second national language.

13. A machine method of performing translations according to claim 12 wherein the national target language translation is displayed on-screen to permit final manual editing prior to printing.

14. A machine method of performing translations according to claim 13 wherein a printed copy of the translation may be provided after said final editing, if any.

15. A machine method of performing translations according to claim 1 wherein the selection of the grammatical tag is based upon the relationship of the tagged word with the words before or after, and artificial intelligence is provided and consulted to utilize data source means for determination of said grammatical tag based on usage.

16. A machine method of performing translations according to claim 10 wherein the translation into said target natural language is subjected to a plurality of secondary programs in said data base to analyze and adjust said words within the sentences based on their grammatical tags.

17. A machine method of performing translations according to claim 16 wherein said translated and adjusted sentences are subjected to declination of adjectives according to construction rules of the target language and based upon prepositions encountered in the phrase being subjected to examination and the position of the following noun, based on context recognition in said data base storage.

18. A machine method of performing translations according to claim 17 wherein said translated sentences, as previously adjusted, are subjected to an adverb and verb program, said adverbs, if any, are shifted around verbs according to the common preference in the target language, said verbs being conjugated in accordance with unique conjugations of the target language, the created internationally universal language having saved time and memory space by regularizing the verbs in initial translation, thereby eliminating the requirement for an unusually high number of irregular verbs in the first national language being matched to an excess number of irregular verbs in the target national language.

19. A machine method of performing translations according to claim 18 wherein the translations of each sentence into the target language is collected in a single file and then recomposed line by line into a document in the target national language.

20. A device for reversible translation of one national language into a second national language, including a keyboard for input of source text in said one national language, a computer to accept said input, interpretive dictionary data base means including data on said one national language and data on said second national language as well as data on a created internationally universal intermediate pathway language, means for directing said source text input into a single file, means for parsing each sentence of said text into independent files and applying a syntax identifier to each said sentence, means for translating said one national language into said intermediate pathway of said created internationally universal language and translating from said internationally universal language into said second national language, means for collecting the translated sentences in the second national language in a single file and subsequently recomposing said last mentioned translated sentences, if needed, into a completely translated document, and means for providing output of at least visually displayed copies of said translated text.

21. A device of the type contemplated in claim 20 wherein said computer includes syntax data means for recomposing said translated text to accommodate irregular verbs, proper placement of adverbs and pronouns in accordance with accepted grammatical practice in the second national language.

22. A device of the type contemplated in claim 20 wherein said copy of the initial source language text as well as the translated target language text may be printed into a hard copy.

23. A universal language interpretive data processing device including means for accepting a string of words in normal succession in a first natural language, means for separating individual words that have but one meaning and immediately interpreting such words into an internationally universal manmade intermediate language, separating the remaining words and subjecting them individually to syntax means for carrying out a relational examination relative to their disposition and association with other words in said string to establish each of their categories, i.e., noun, verb, adjective, adverb ... etc., and then to interpret them in proper context to said intermediate language, reversible operational means for then carrying out the interpretation from said intermediate language to one of several natural target languages, said operation being totally reversible, whereby said device is capable of carrying out an interpretation from any one of said several target languages to said first natural language as well as to or from any of the other target languages without reworking of said intermediate internationally universal language pathway to accommodate changes in source or target languages of said interpretive device.

24. A universal machine method adapted to be implemented on a data processing device utilizing a data base for performing reversible translations of selected input text between any one of a plurality of first national source languages into any one of a plurality of second national target languages, including:
 a first step of storing a first source text in any one of a plurality of national languages in a storage means as a first source text file;
 a second step of translating said first source national text file into a created internationally universal intermediate language which serves as a totally reversible intermediate pathway, and storing said translation into said internationally universal intermediate language in a second text file; and a reversible third step of translating said second text file from said created internationally universal language into any one of said plurality of second national target languages, said reversible translations capable of being carried out without reworking said intermediate pathway of said created internationally universal language with each new source or target language, thus the translation is totally reversible and can go from language A to language B, as well as from language B to A with equal facility.

25. A method as claimed in claim 24 wherein the first source text is parsed into sentences with a file being assigned to each sentence, there being no limitation as to the length or complexity of any sentence so parsed, whereby complete fluidity in translation is accomplished.

26. A method as claimed in claim 24 wherein the translation process is reversible between any number of said plurality of languages with equal facility.

27. A method as claimed in claim 24 wherein a data base is provided with which data base said intermediate internationally universal language works readily to determine from the context and position of words within the source text the grammatical identification of each word in said text for further use in translation into any one of said plurality of national target languages.

28. A universal method of performing reversible interpretations between any one of a plurality of first national source languages and into any one of a plurality of second national target languages including:

a first step of storing a source text in said any one first national language in a storage means as first text file;

said first step including a first substep that parses said source text into individual sentences, with each sentence in its own separate subfile;

a second step of interpreting said sentences into a created internationally universal language which serves as an intermediate pathway, as the words making up said sentences are translated into the created internationally universal language, they are entered into individual files consisting of the word plus a grammatical tag, such tag consisting of a designation of the word's grammatical posture, i.e., noun, pronoun, verb, adverb . . . etc., the selection and designation of said grammatical tag being based upon the syntax relationship of the tagged words with the words positioned before or after the tagged word, and artificial intelligence is provided and capable of being consulted to utilize data source means for determination of said grammatical tag based on usage within said parsed sentences, a third step of interpreting said tagged words from said created internationally universal language into any one of said second national target languages;

said interpretation into said any one of said target languages is subjected to a plurality of secondary programs to analyze and adjust said words within said target language sentences based on their grammatical tags;

said interpreted and adjusted sentences being further subjected to declination of adjectives according to construction rules of the said any one target national language and based upon prepositions encountered in the phrase or sentence being subjected to examination and the position of the following noun, based on context recognition in data storage;

said interpretation steps including said analyzing and adjusting being totally reversible within said intermediate pathway of said internationally universal language, there being no requirement of reworking said intermediate pathway to accommodate any changes in source national language as well as target national languages.

29. The method as set forth in claim 28, wherein said interpreted phrases or sentences, as previously analyzed and adjusted, being still further subjected to an adverb and verb program, said adverbs, if any, being shifted around verbs according to the common preference in the target language, said verbs being conjugated in accordance with the unique conjugations of the target language morphology, the created internationally universal language having saved time and computer memory space by regularizing the verbs in initial translation, thereby eliminating the requirement for an unusually high number of irregular verbs in said first national source language being matched to an excess number of irregular verbs in the target national language.

* * * * *